United States Patent [19]

Nusslein et al.

[11] 3,928,615

[45] Dec. 23, 1975

[54] METHOD OF PROTECTING SEEDS AND PLANTS AGAINST FUNGI

[75] Inventors: Ludwig Nusslein; Kurt Roder; Ernst Albrecht Pieroh, all of Berlin, Germany

[73] Assignee: Schering Aktiengesellschaft, Berlin and Bergkamen, Germany

[22] Filed: Feb. 21, 1974

[21] Appl. No.: 444,410

Related U.S. Application Data

[63] Continuation-in-part of Ser. No. 244,260, April 14, 1972, abandoned.

[30] Foreign Application Priority Data

May 6, 1971 Germany............................ 2123023

[52] U.S. Cl. ................................................ 424/263
[51] Int. Cl.² ...................... A01N 9/00; A01N 9/22

[58] Field of Search........................... 424/263, 270

[56] References Cited
UNITED STATES PATENTS
3,598,830 8/1971 Berkelhammer et al. .......... 424/270

OTHER PUBLICATIONS
Chem. Abst. 49, 10938(c–d), (1955) – Yoshide et al.
Chem. Abst. 74, 87996(d), (1971) – Haratoshi et al.

*Primary Examiner*—Albert T. Meyers
*Assistant Examiner*—D. W. Robinson
*Attorney, Agent, or Firm*—Joseph F. Padlon

[57] ABSTRACT

2-(4-Pyridyl)-5-alkylsulfinyl-1,3,4-thiadiazoles and the sulfonyl analogs thereof have strong fungicidal effects combined with low toxicity to crop plants.

1 Claim, No Drawings

METHOD OF PROTECTING SEEDS AND PLANTS AGAINST FUNGI

This application is a continuation-in-part of the co-pending application Ser. No. 244,260, filed on Apr. 14, 1972, and now abandoned.

2-(4-pyridyl)-5-alkylsulfinyl-1,3,4-thiadiazoles and the analogous 2-(4-pyridyl)-5-alkylsulfonyl-1,3,4-thiadiazoles in the free form or in the form of their adducts with acids, including Lewis acids, have been found to have strong fungicidal effects while being harmless to crop plants and their seeds.

The sulfonyl analogs, wherein alkyl has up to six carbon atoms and includes cycloalkyl, are known to have antibacterial effects (C.A. 74 [1971] 87989d) and to be prepared by oxidation of the corresponding 2-alkylthio compounds with potassium permanganate. The thio compound may be produced in a sequence of steps starting from isonicotinic acid hydrazide and thiocyanic acid (C.A. 49 [1955] 10937d).

Mild oxidizing agents such as tert-butyl hydroperoxide, m-chloroperbenzoic acid, N-bromosuccinimide, hydrogen peroxide, sodium metaperiodate, when used in only small excess over the stoichiometric amount at temperatures between 0° and 60°C, have been found to produce the sulfinyl analogs, which are new compounds, in excellent yields. The reaction is carried out in an inert organic solvent.

The alkyl-sulfonyl- and alkyl-sulfinyl-pyridyl-thiadiazole derivatives combine readily with acids to form adducts. Water-soluble adducts have been prepared from a wide variety of organic acids, inorganic acids, and Lewis acids. They are at least as effective fungicides as the free bases in corresponding amounts, and compare favorably with known fungicides in their effects against a wide spectrum of seed- and soil-borne phytophatogenic agents including Pythium, Rhizoctonia, Tilletia, Helminthosporium, and others. Both the bases and the adducts may thus be applied to seeds, mixed with a top layer (about 20 cm) of the soil prior to seeding, or they may be applied to the furrows in the soil together with the seeds prior to germination.

The active agents are formulated with inert carriers in a conventional manner to produce compositions which are particulate solids, solutions, emulsions, or suspensions, and may contain auxiliary materials enhancing their effectiveness in a known manner such as wetting agents. When employed as seed disinfectants, the compositions containing the thiadiazole compounds preferably contain identifying coloring matter.

The following Examples are further illustrative of this invention.

EXAMPLE 1

10.5 g Potassium permanganate was added to a solution of 11.3 g 2-(4-pyridyl)-5-ethylthio-1,3,4-thiadiazole in 75 ml glacial acetic acid and 25 ml water. The mixture was stirred at 40°C for two hours, cooled to 10°C, and decolorized by adding sodium bisulfite solution. A precipitate was filtered off and recrystallized from ethanol. 10.6 g 2-(4-Pyridyl)-5-ethylsulfonyl-1,3,4-thiadiazole melting at 142°C was obtained, and will be referred to hereinbelow as Compound A.

EXAMPLE 2

11.3 g 30 percent Hydrogen peroxide solution was added to a solution of 22.3 g 2-(4-pyridyl)-5-ethylthio-1,3,4-thiadiazole in 250 ml glacial acetic acid. The mixture was left to stand overnight at about 35°C, whereupon the solvent was distilled off. The residue, when recrystallized from ethanol, yielded 23.5 g 2-(4-pyridyl)-5-ethylsulfinyl-1,3,4-thiadiazole melting at 108°C. It will be referred to hereinbelow as Compound B.

The homologs listed below in Table I with their melting points were prepared in a corresponding manner. They are assigned capital letters for further identification hereinbelow.

TABLE I

| | Compound | M.P. °C |
|---|---|---|
| C | 2-(4-Pyridyl)-5-methylsulfonyl-1,3,4-thiadiazole | 186 |
| D | 2-(4-Pyridyl)-5-methylsulfinyl-1,3,4-thiadiazole | 149 |
| E | 2-(4-Pyridyl)-5-isopropyl-sulfonyl-1,3,4-thiadiazole | 146 |
| F | 2-(4-Pyridyl)-5-propylsulfinyl-1,3,4-thiadiazole | 103 |
| G | 2-(4-Pyridyl)-5-butylsulfinyl-1,3,4-thiadiazole | 77 |
| H | 2-(4-Pyridyl)-5-butylsulfonyl-1,3,4-thiadiazole | |

EXAMPLE 3

4.5 g 95 percent Sulfuric acid was stirred slowly into a solution of 10 g Compound B in 100 ml tetrahydrofuran, and stirring was continued for another 30 minutes. The mixture was then cooled, and the precipitate formed was filtered off with suction, washed, and dried. 13 g 2-(4-Pyridyl)-5-ethylsulfinyl-1,3,4-thiadiazole dihydrogen sulfate was recovered and melted with decomposition at 168°C. It will be referred to hereinafter as Compound B18.

Additional salts or adducts were prepared from other bases described in Examples 1 and 2 or listed in Table I. They are identified in Table II for further reference by a capital letter denoting the base compound and a numeral. The table lists the acid moiety and the melting temperature at which most salts and adducts decomposed.

TABLE II

| No. | Acid Moiety | M.P., °C |
|---|---|---|
| A1 | hydrochloric acid | 211 |
| B1 | hydrochloric acid | 171 |
| B2 | hydrobromic acid | 173 |
| B3 | nitric acid | 162 |
| B4 | methylsulfuric acid | 139 |
| B5 | oxalic acid | 183 |
| B6 | maleic acid | 125 |
| B7 | methanesulfonic acid | 173 |
| B8 | toluenesulfonic acid | 143 |
| B9 | boron trifluoride | 160 |
| B10 | ½ zinc chloride | 260 |
| B11 | ½ mercuric chloride | 186 |
| B12 | ½ cupric chloride | 230 |
| B13 | perchloric acid | 173 |
| B14 | ½ calcium chloride | >340 |
| B15 | ½ manganous chloride | >340 |
| B16 | ½ nickel chloride | >340 |
| B17 | trifluoromethanesulfonic acid | 156 |
| B19 | ½ cobaltous chloride | 296 |
| C1 | sulfuric acid, monohydrate | 173 |
| C2 | methanesulfonic acid | 222 |
| C3 | maleic acid | 155 |
| C4 | oxalic acid | 203 |
| C5 | nitric acid | 217 |
| C6 | hydrobromic acid | 260 |
| C7 | perchloric acid | 239 |
| C8 | ½ cobaltous chloride | >340 |
| C9 | ½ zinc chloride | 296 |
| C10 | hydrogen iodide | 255 |
| C11 | toluenesulfonic acid | 210 |
| C12 | hydrochloric acid | 250 |

TABLE II-continued

| No. | Acid Moiety | M.P., °C |
|---|---|---|
| C13 | phosphoric acid | 170 |
| C14 | boron trifluoride | 265 |
| C15 | ½ mercuric chloride | 228 |
| F1 | sulfuric acid | 157 |
| G1 | sulfuric acid | 138 |
| H1 | sulfuric acid | 159 |

The salts and adducts are soluble in water and many organic solvents including xylene, cyclohexanone, methylene chloride, ethylene chloride, chloroform, dichloropropane, ethyl ether, ethyl acetate, dimethylformamide, and dimethylsulfoxide.

EXAMPLE 4

Two-liter batches of steamed compost soil in clay bowls were inoculated with mycelium of Pythium ultimum or Rhizoctonia solani. Cotton seeds were disinfected with liquid 50 percent compositions of the fungicides listed in Table III at a rate of 0.5 g fungicide per kg of seeds, and 50 grains were planted in each bowl. The seeded bowls were kept at 24° to 26°C for two weeks, and the cotton seedlings then were inspected. The number of healthy plants in each test is listed in Table III as a percentage of the number of seeds planted.

TABLE III

| Compound | Pythium | Rhizoctonia |
|---|---|---|
| C | 34% | 28% |
| C1 | 54% | 58% |
| D | 16% | 28% |
| A | 36% | 18% |
| Methyl-1-(butylcarbamoyl- -2-benzimidazole-carbamate | 0% | 56% |
| 1,4-Dichloro-2,5-dimethoxy- benzene | 0% | 42% |
| 2-Ethoxy-3-trichloromethyl- 1,2,4-thiadiazole | 16% | 6% |
| Sodium p-dimethylamino- benzenediazo-sulfonate | 12% | 4% |

No healthy seedlings were produced from seeds which had not been disinfected and were planted in soil infected with Pythium, and 4 percent in the presence of Rhizoctonia. Seeds not disinfected, but planted in the steamed soil which was not infected, produced 82 percent healthy seedlings.

The known fungicides are effective against Pythia or Rhizoctonia, but not both as are the fungicides of this invention.

EXAMPLE 5

Seeds of sugar beets were disinfected with liquid 50% formulations of Compound C1 at rates of 1 g and 2 g active agent per kg of seeds. 100 Seeds each were planted in compost soil batches naturally infested with damping-off fungi. The cultures were kept at 22° to 24°C, and 79 and 80 healthy plants respectively were counted after two weeks.

Under identical conditions, tetramethylthiurame disulfide produced 35 and 38 healthy plants. Only 20 healthy plants were obtained in the same soil from seeds which had not been disinfected. When the soil was sterilized by steaming, untreated seeds produced 77 percent healthy plants.

EXAMPLE 6

Sugar beet seed (monogerm) infected with Phoma betae was disinfected with 50 percent formulations of the fungicides listed in Table IV in amounts of 1 g and 2 g active agent per kg of seed, and 100 seeds treated with each fungicide were placed in respective batches of steamed compost soil. The cultures were kept at 22° to 24° for three weeks, and the healthy plants then were counted.

TABLE IV

| Compound | 1 g/kg | 2 g/kg |
|---|---|---|
| C1 | 58 | 87 |
| C2 | 73 | 79 |
| C4 | 61 | 83 |
| C5 | 77 | 83 |
| C6 | 74 | 77 |
| C7 | 79 | 74 |
| C8 | 69 | 89 |
| C9 | 84 | 77 |
| C10 | 72 | 78 |

Tetramethylthiurame disulfide, under the same conditions, produced 30 and 66 healthy plants respectively, whereas only 21 healthy plants were produced in a control test with untreated seed plants in the same soil.

EXAMPLE 7

Barley seed naturally infested with Helminthosporium gramineum was set out in soil and held at 5° to 10°C in an airconditioned chamber. After 3 to 4 weeks, the plants were inspected and 48 percent of the primary leaves showed symptoms of infection.

Twelve batches of the seeds were mixed dry with respective fungicides of the invention listed in Table V at a rate of 25 g per 100 kg seed, the fungicides being mixed with kaolin, talc, dye, and oil in the usual manner for uniform distribution. Additional twelve batches were similarly treated with 10 g fungicide per 100 kg barley, and two batches were mixed with methoxyethyl-mercury silicate at 25 g/100 kg and 10 g/100 kg respectively. With the untreated controls used as a base of calculation, the methoxyethyl-mercury silicate permitted an infection rate of 0 percent and 0.7 percent respectively. The infection rates observed with the fungicides of the invention, calculated on the same basis, are listed in Table V.

TABLE V

| Compound | 25 g/100 kg | 10 g/100 kg |
|---|---|---|
| C | 5% | 12% |
| C1 | 5% | 14% |
| D | 1.4% | 6% |
| A | 0.6% | 0.4% |
| A1 | 0.3% | 0.7% |
| B | 0% | 0% |
| B18 | 0% | 0.2% |
| B1 | 0.1% | 0.2% |
| B13 | 0.3% | 0.3% |
| B14 | 0.3% | 0% |
| B15 | 0.3% | 1.3% |
| B16 | 0% | 0.7% |

EXAMPLE 8

The effects of 2-(4-pyridyl)-5-ethylsulfinyl-1,3,4-thiadiazole which is insoluble in water, and of its water-soluble hydrochloride and sulfate on Helminthosporium infected barley seeds were tested. In each test lot, 421 plants, on an average, were grown from barley seeds which were treated with 25 g or 10 g active agent. Untreated seeds produced 25 percent infected plants, and this number was the basis for the percentage of infected plants reported below.

Each batch of seeds was intimately mixed with the active agents in the form of powders and of aqueous solutions before seeding. Methoxyethyl-mercury silicate powder produced 1 percent and 6.4 percent infected plants based on the number of plants expected to be infected when grown from untreated seeds. The results achieved with the compounds of the invention are shown below in Table VI.

TABLE VI

| Compound | 25 g/100 kg | 10 g/100 kg |
| --- | --- | --- |
| B (P) | 0.5% | 0.7% |
| B18 (P) | 0.2% | 0.2% |
| B1 (P) | 0.5% | 1.2% |
| B18 (L) | 0% | 0.5% |
| B1 (L) | 0% | 1.2% |

(P) powder
(L) dissolved in 1000ml water per 100 kg seed

EXAMPLE 9

The fungicides listed below in Table VII were field tested in their effects on winter barley infected with Helminthosporium gramineum and on winter wheat infected with Tilletia caries in field tests. The seeds were treated with the fungicides in amounts of 50 g/100 kg seed and 25 g/100 kg seed in the form of powders and aqueous solutions in the manner of the preceding Examples, and each batch of seeds was planted in three plots. The number of plants inspected averaged 1027 for the barley and 1070 for the wheat per batch of seed. Untreated control showed evidence of infection in 4.8% of the barley plants and 49 percent of the wheat plants.

For comparison purposes, chemically related thiadiazole compounds were tested in the same manner, and are identified in Table VII below as follows:

TM     2-Trifluoromethyl-5-methylsulfonyl-1,3,4-thiadiazole

DM     2-Dichloromethyl-5-methylsulfinyl-1,3,4-thiadiazole

TE     2-Trifluoromethyl-5-ethylsulfonyl-1,3,4-thiadiazole

Methoxyethyl-mercury silicate used as a powder, when tested in the same manner, completely suppressed infection. The percentage of the total number of infected plants is listed for each batch of seeds in Table VII.

TABLE VII

| Comp. | | Winter barley 50g/100kg | 25g/100kg | Winter wheat 50g/100kg | 25g/100kg |
| --- | --- | --- | --- | --- | --- |
| A | (P) | — | — | 1.0% | 2.2% |
| A1 | (P) | — | — | 0.7% | 2.7% |
| B | (P) | 0.1% | 0.4% | 0.2% | 0.1% |
| B18 | (P) | 0% | 0.1% | 4.1% | 6.3% |
| B1 | (P) | — | — | 1.3% | 1.5% |
| B18 | (L) | 0% | 0.3% | 0% | 0.1% |
| B1 | (L) | — | — | 0% | 0.3% |
| TM | (P) | 0.3% | — | 1.7% | 8.9% |
| DM | (P) | 1.8% | 2.7% | — | — |
| TE | (P) | — | — | 8.7% | 19% |

(P) powder
(L) aqueous solution as in Example 8

As is evident from Table VII, replacing the pyridyl group in the compounds of the invention by halomethyl groups causes a decrease in the fungicidal effects by approximately one decimal order of magnitude.

The Examples show that the method of the invention provides protection against a relatively wide spectrum of fungi. The compounds employed are free of the toxicity of conventional mercury compounds employed for the same purpose, and are more effective against phytopathogenic fungi than other fungicides now in commercial use. The compounds of the invention are better tolerated by crop plants than the haloalkyl derivatives of thiadiazole.

Best results in protecting cereal crops are generally achieved with 2-(4-pyridyl)-5-ethylsulfinyl-1,3,4-thiadiazole dihydrogen sulfate, while 2-(4-pyridyl)-5-methylsulfonyl-1,3,4-thiadiazole dihydrogen sulfate monohydrate is particularly beneficial in combating soil dwelling fungi affecting sugar beet and cotton. These two active agents are practically without harmful effects on the crop plants at application rates which provide good fungus control.

While the primary effects of the fungicides are due to their presence in the soil surrounding the seeds and roots of the plants, they also have systemic effects as is evident from inspection of plant parts above the ground which were produced from treated seeds.

What is claimed is:

1. The method for protecting crop plants against infestation by seed-borne and soil-borne phytopathogenic fungi which comprises contacting the seeds of said crop plants, prior to germination, with a fungicidal amount of a compound selected from the group consisting of 2-(4-pyridyl)-5-alkylsulfonyl-1,3,4-thiadiazole and 2-(4-pyridyl)-5-alkylsulfinyl-1,3,4-thiadiazole in which the alkyl group has from 1 to 5 carbons and the acid adducts of said thiadizoles.

* * * * *